United States Patent [19]
Arnold

[11] 3,934,818
[45] Jan. 27, 1976

[54] METHOD OF OXY-FUEL CUTTING
[75] Inventor: Cornelius Seamans Arnold, Cranford, N.J.
[73] Assignee: Union Carbide Corporation, New York, N.Y.
[22] Filed: Dec. 20, 1972
[21] Appl. No.: 316,997

[52] U.S. Cl.................. 239/8; 239/424; 148/9 R
[51] Int. Cl.² ........................................ B05B 17/04
[58] Field of Search ....... 239/8, 9, 13, 132.3, 132.5, 239/294, 296, 419.3, 424; 266/23 P, 23 R, 23 S; 148/9

[56] References Cited
UNITED STATES PATENTS

| | | | |
|---|---|---|---|
| 2,227,476 | 1/1941 | Williams et al. | 266/23 Q |
| 2,464,351 | 3/1949 | Shorter | 266/23 Q |
| 2,949,391 | 8/1960 | Anderson | 239/132.5 X |

FOREIGN PATENTS OR APPLICATIONS 561,586   5/1944   United Kingdom.................... 148/9

Primary Examiner—John J. Love
Attorney, Agent, or Firm—Dominic J. Terminello

[57] ABSTRACT

Method of oxy-fuel cutting of thin plate the improvement of which comprises surrounding the cutting flame with an admixture of air and water.

1 Claim, 2 Drawing Figures

METHOD OF OXY-FUEL CUTTING

This invention relates to an improved method of oxy-fuel gas cutting of steel plate.

Typically, gas cutting involves heating the portion of the article to be treated by means of a high temperature flame such as an oxygen-acetylene flame, oxygen-propane flame, etc., until the temperature of such portion is raised to its ignition temperature and thereafter blowing a stream of oxygen at the preheated portion to oxidize and burn such portion out from the article. It is desirable that the flame be brought to as high a temperature as is necessary to effect the operation along a narrow line or seam and without unnecessarily dissipating heat over the remaining body of the article being treated. Where the article is steel plate and relatively thin, hereinafter defined as less then one-half inch in thickness, the extreme temperature of the flame causes the cut edges to warp or deform unless the plate is saturated with a cooling medium such as water. The volume of water necessary to effect proper cooling in order to prevent deformation is excessive and causes flooding.

It is therefore the principle object of the present invention to provide an improved method of gas cutting of thin plate wherein the cutting oxygen stream is surrounded by an atomized aerosol mist of air and water the wetness and cooling rate of which is controllable.

For a better understanding of the invention, reference is made to the accompanying drawings, in which.

Figure 1:
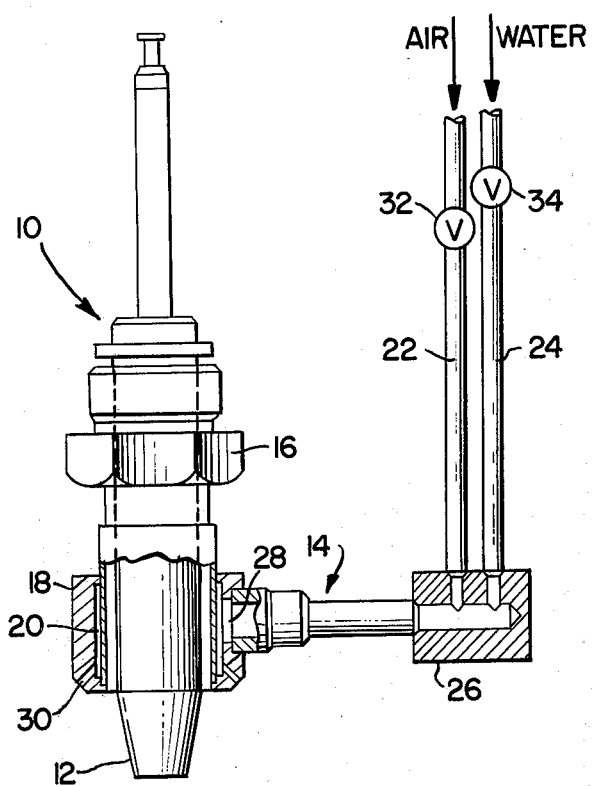
FIG. 1 is a side elevation of a cutting device partially in section embodying the principals of the present invention.
Figure 2:
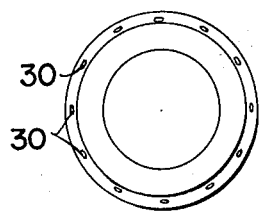
FIG. 2 is a bottom view of the spray nozzle of FIG. 1.

The cutting device 10, illustrated in FIG. 1, includes a conventional cutting gas nozzle 12 from which issues a stream of a gaseous mixture to produce the preheat flame and a stream of cutting oxygen. A spray nozzle assembly 14 is coupled to the gas nozzle 12 and is held securely by a common threaded bolt 16. The spray nozzle assembly 14 includes an ejector head 18 which surrounds the cutting nozzle 12 forming therebetween an annual cavity 20. A pair of conduits 22 and 24 respectively are connected to a common manifold 26 which is in turn connected to cavity 20 through inlet 28. Air and water is separately passed through the conduits 22 and 24 and combined in manifold 26 from whence it is passed into the cavity 20 and discharged through the exit ports 30 in the ejector head 18. The exit ports are disposed at an angle of 45 degrees with respect to the longitudinal axis of the cutting nozzle 12.

To establish a mixture of air and water which will provide a cooling effect at least as effective as a luquid water spray without suffering the consequences of excessive water volume, the flow rate of water should be between 10–15 gal. per hr. while the air flow rate should be between 75–100 cf/hr. at 15 to 25 psig. By adjustment of the air/water ratio within the stated flow ranges the moisture content can be precisely controlled to achieve the desired cooling rate and without saturating the plate. The aerosol mist produced by the air and water mixture enhances the cooling rate over that of a water spray by taking advantage of the latent heat of vaporization. The mist has also been found to be more effective in minimizing distrotion than with the use of known liquid cooling sprays.

The mixing of the air and water is begun in the manifold 26 and then brought into the annular cavity 20 where a more even distribution occurs. The valves 32 and 34 are used to control the air and water flow rates respectively.

What is claimed is:

1. In a method of oxy-fuel gas cutting of relatively thin steel plate wherein a high temperature cutting flame is directed at a portion of said plate to be cut, the improvement of which comprises:

passing a stream of air into a mixing zone adjacent said nozzle at a rate of between 75 to 100 cu.ft/hr at 15 to 25 psig;

passing a stream of water into said mixing zone at a rate of between 10 to 15 gal. per hr;

discharging the admixture of said water and air from said mixing zone to form an atomized aerosol mist; and directing said mist in the form of a curtain about said cutting flame and as close as possible thereto without causing physical interference therewith.

* * * * *